United States Patent [19]  [11] 4,347,012
Glidden  [45] Aug. 31, 1982

[54] METHOD AND APPARATUS FOR TENSION SETTING AND COMPRESSION RELEASING TUBULAR CONNECTORS

[75] Inventor: Gregory L. Glidden, Houston, Tex.

[73] Assignee: FMC Corporation, Chicago, Ill.

[21] Appl. No.: 71,811

[22] Filed: Sep. 4, 1979

[30] Foreign Application Priority Data

Oct. 7, 1978 [GB] United Kingdom ............... 39709/78

[51] Int. Cl.³ .......................... F16B 1/00; F16D 9/00; F16P 5/00
[52] U.S. Cl. ........................................ 403/2; 403/326; 114/230; 114/294; 405/224; 441/3
[58] Field of Search ............................... 405/224–226; 114/230, 293, 294, 257; 9/8 P; 403/2, 326 X, DIG. 7, 366–368; 285/3, 4, 18, 24, 26, 27, 29, 321, 307

[56] References Cited

U.S. PATENT DOCUMENTS

| | | | |
|---|---|---|---|
| 3,424,477 | 1/1969 | Putch et al. | 285/18 |
| 3,439,944 | 4/1969 | Leutenegger | 285/321 |
| 3,731,955 | 5/1973 | Borsum et al. | 285/111 |
| 3,741,589 | 6/1973 | Herd et al. | 285/3 |
| 3,773,360 | 11/1973 | Timbers | 285/321 |
| 3,887,222 | 6/1975 | Hammond | 285/307 |

FOREIGN PATENT DOCUMENTS

| | | |
|---|---|---|
| 908059 | 10/1962 | United Kingdom . |
| 984281 | 2/1965 | United Kingdom . |
| 1259461 | 1/1972 | United Kingdom . |
| 1408667 | 10/1975 | United Kingdom . |

Primary Examiner—Trygve M. Blix
Assistant Examiner—D. W. Keen
Attorney, Agent, or Firm—Lloyd B. Guernsey; W. William Ritt, Jr.

[57] ABSTRACT

A diverless subsea tubular connector with male and female elements that can be remotely connected and disconnected using only axial movement of one of the elements with respect to the other. The connector elements are secured together by a snap spring that prevents their disengagement so long as an axial tension tending to pull them apart is maintained. A release of that axial tension facilitates unlocking the two elements so that they can be pulled apart without requiring hydraulic, manual, or rotational manipulation.

13 Claims, 9 Drawing Figures

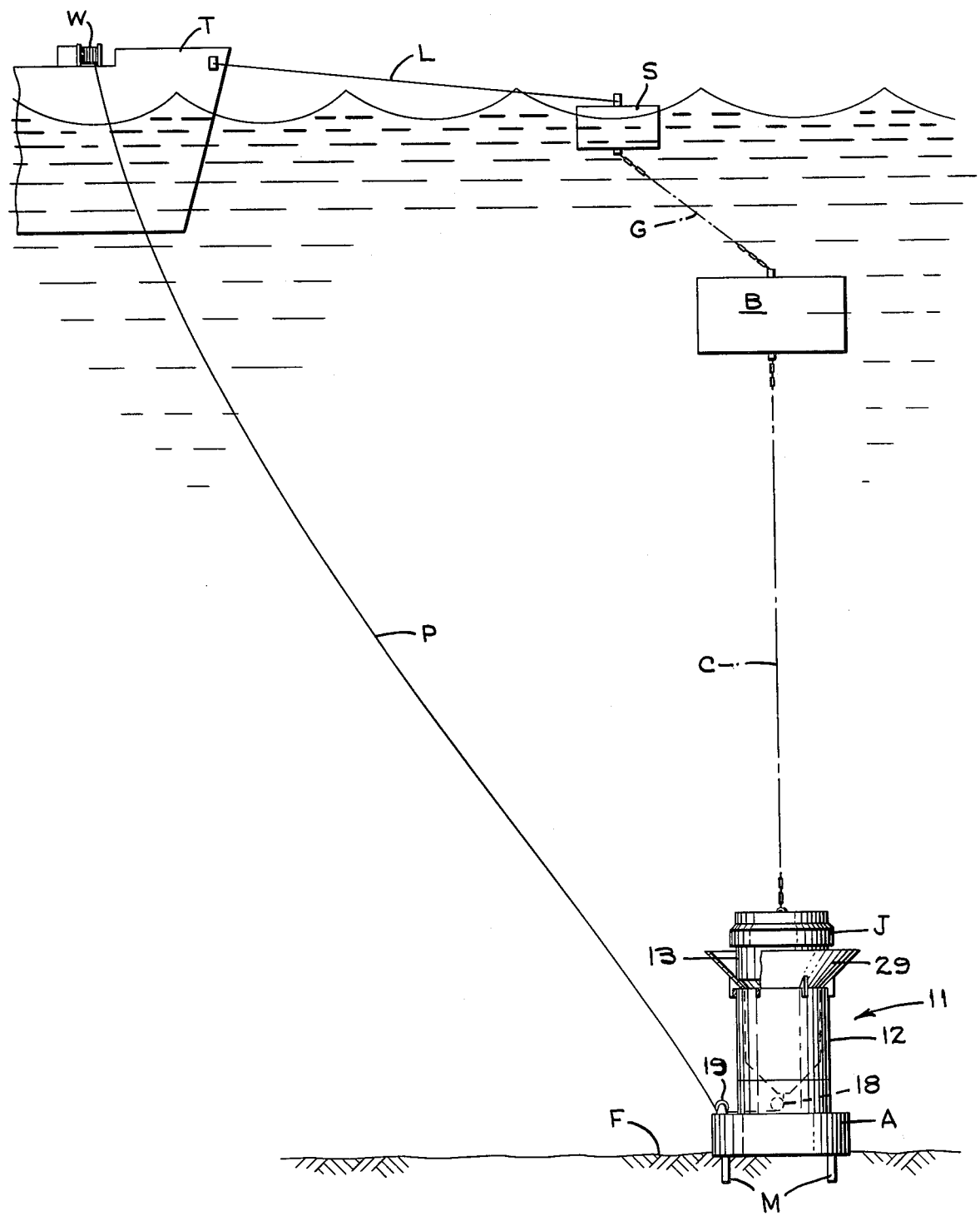
FIG_1

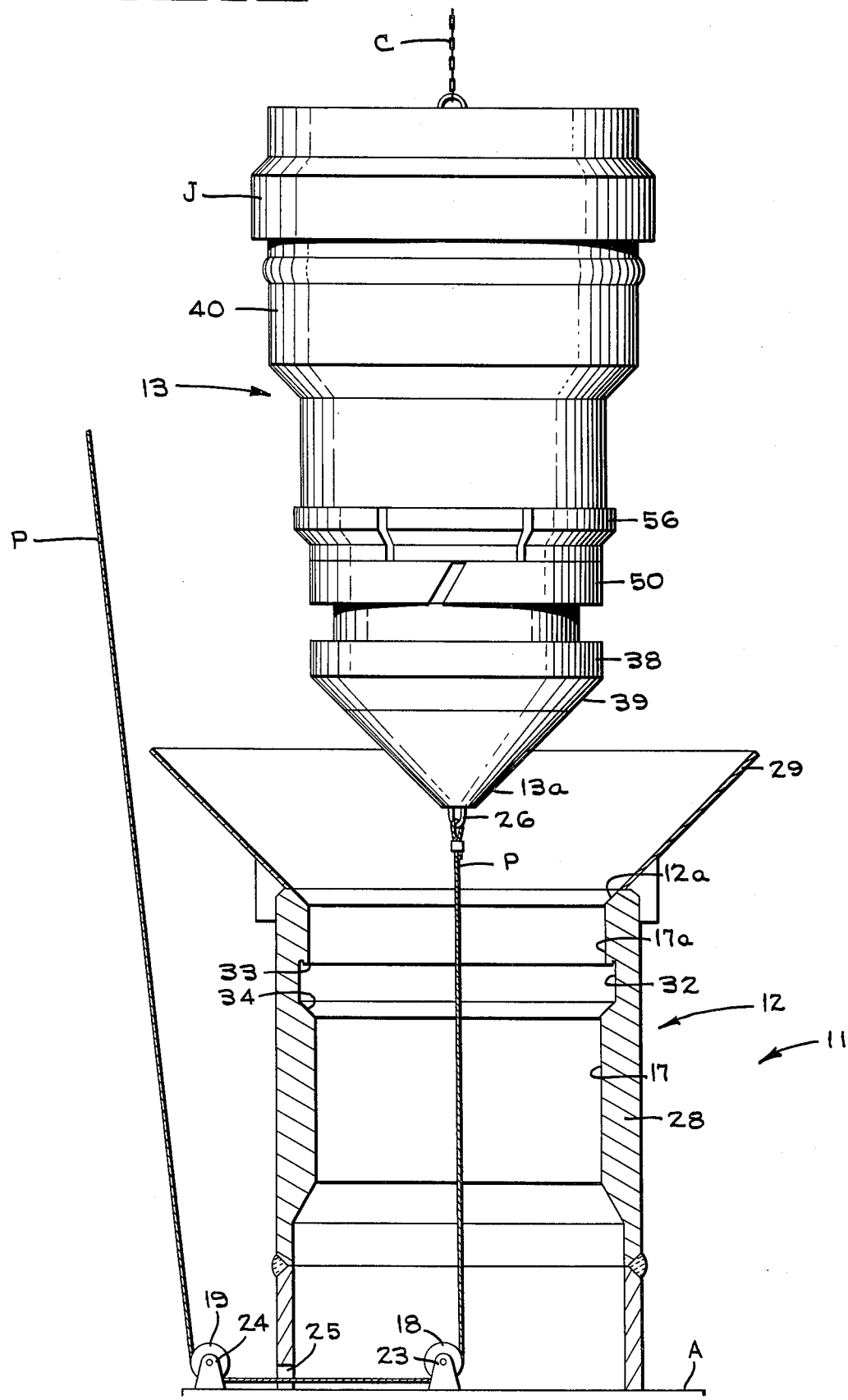

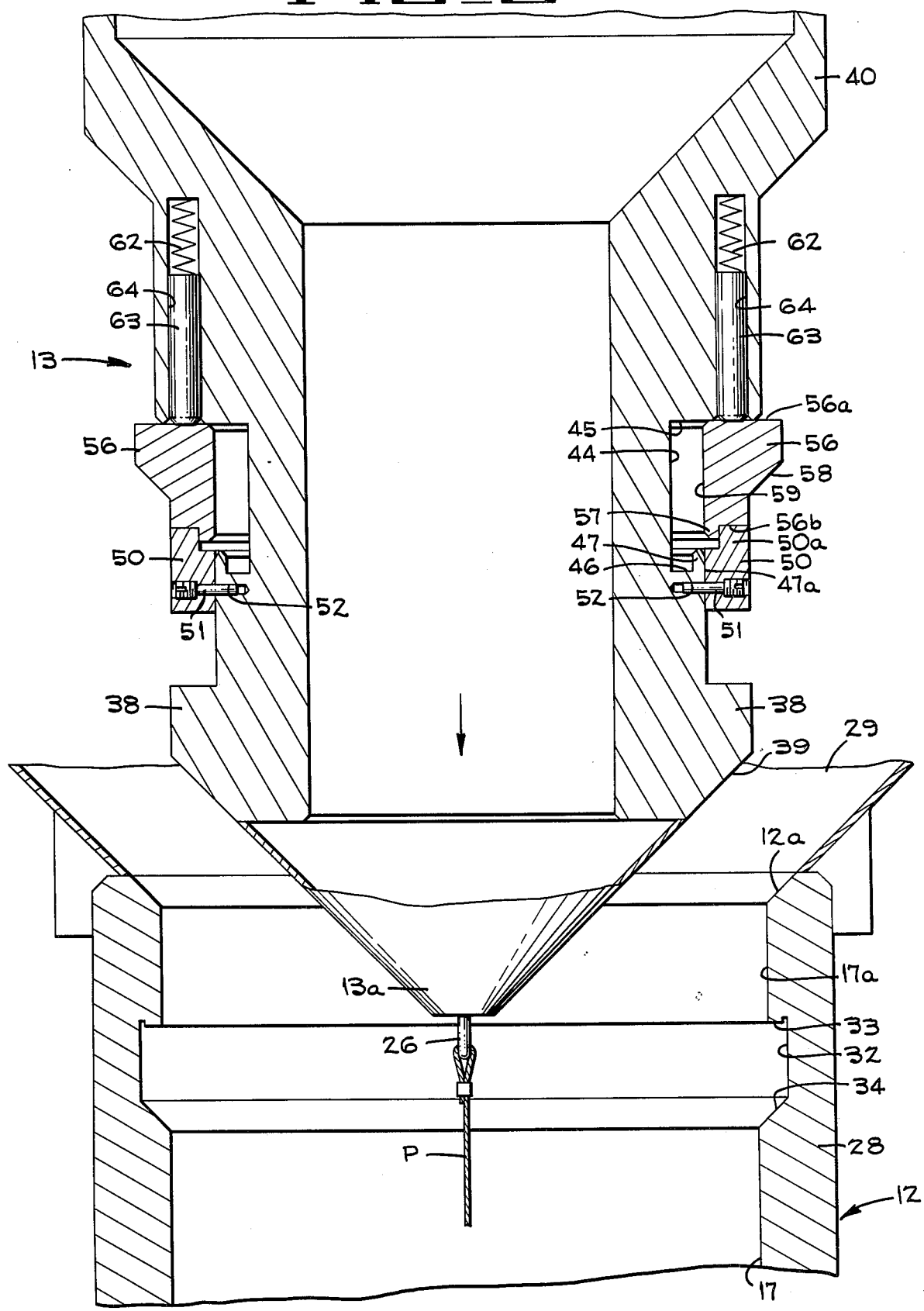
FIG_3

FIG_4
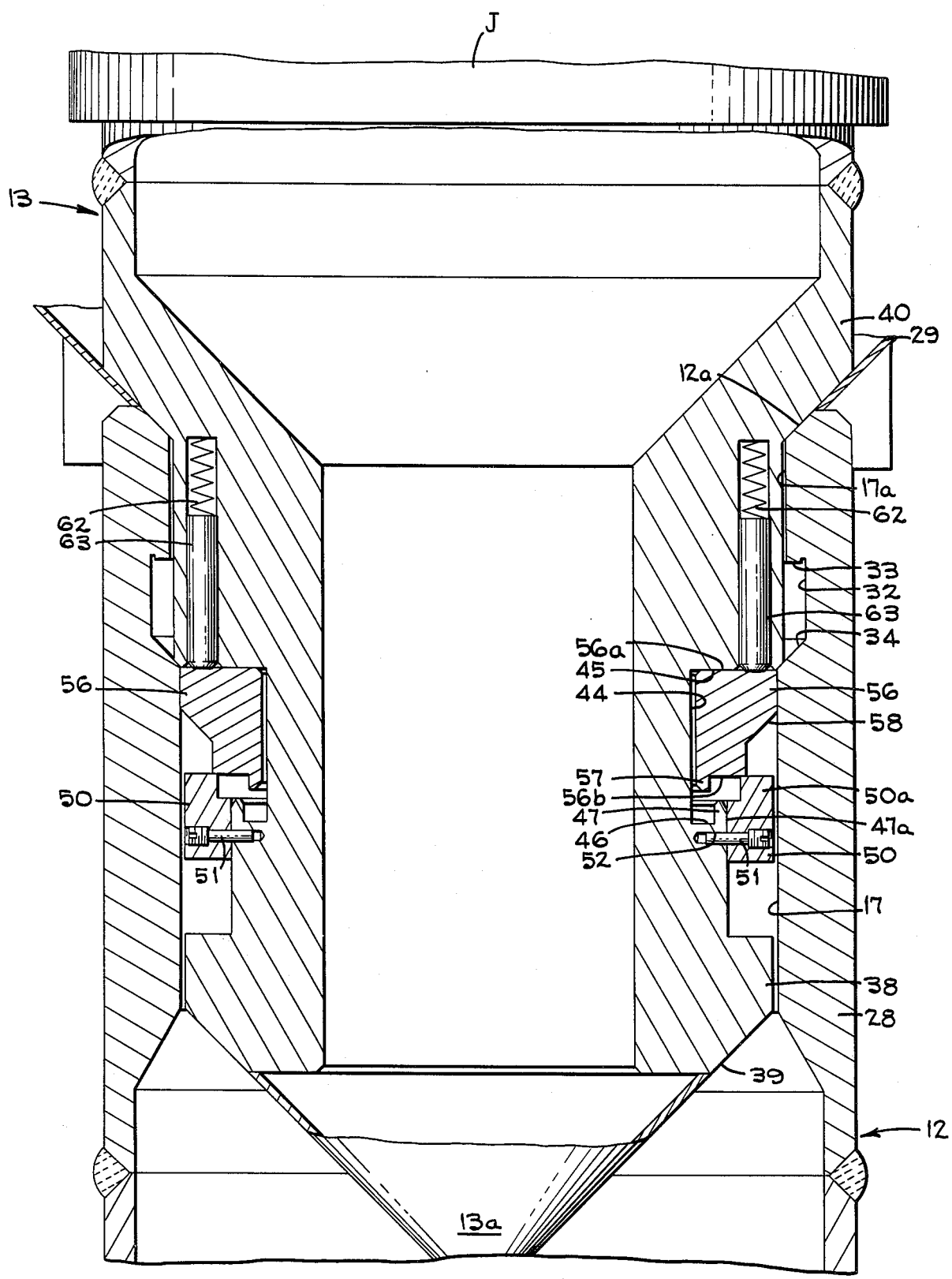

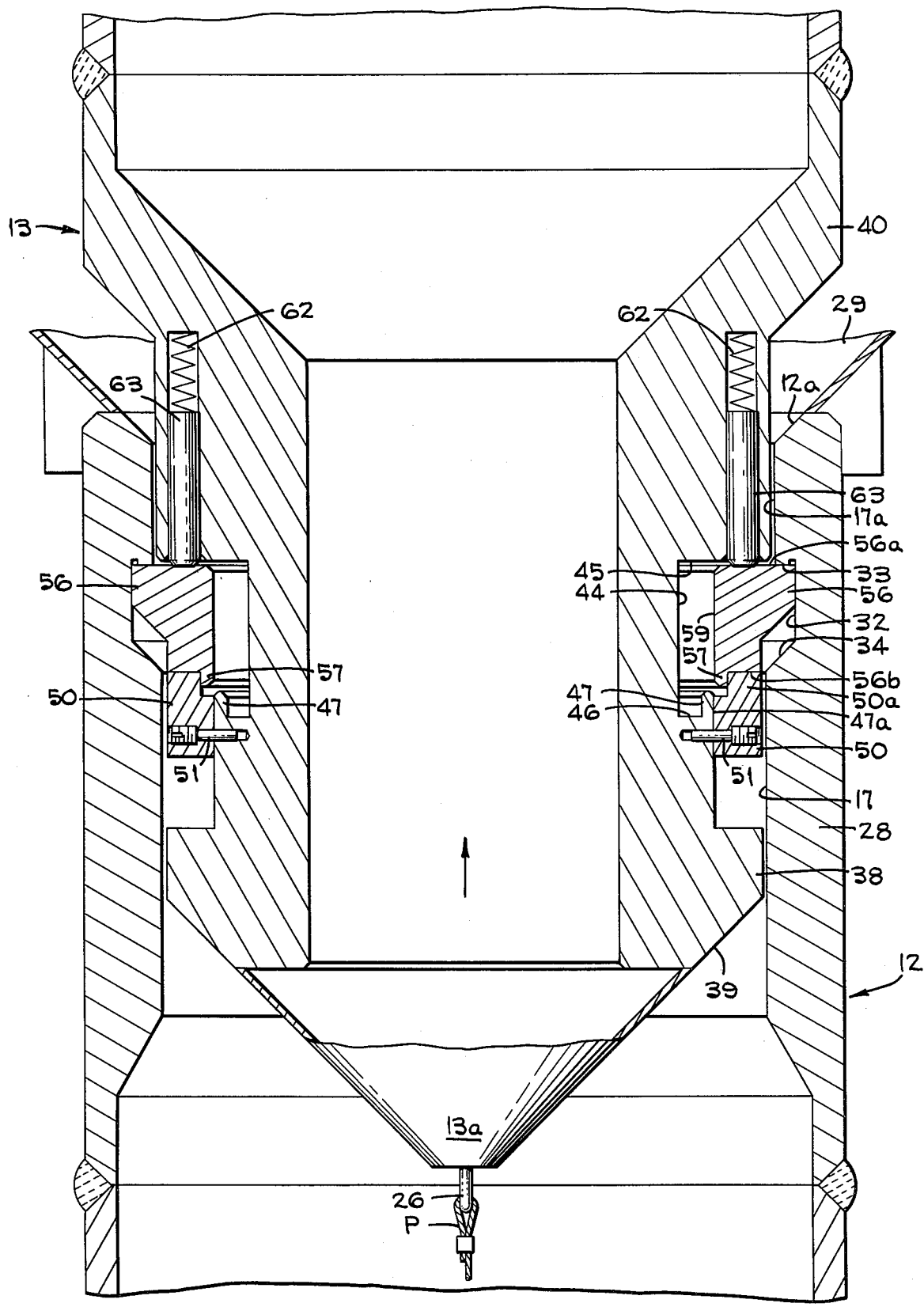

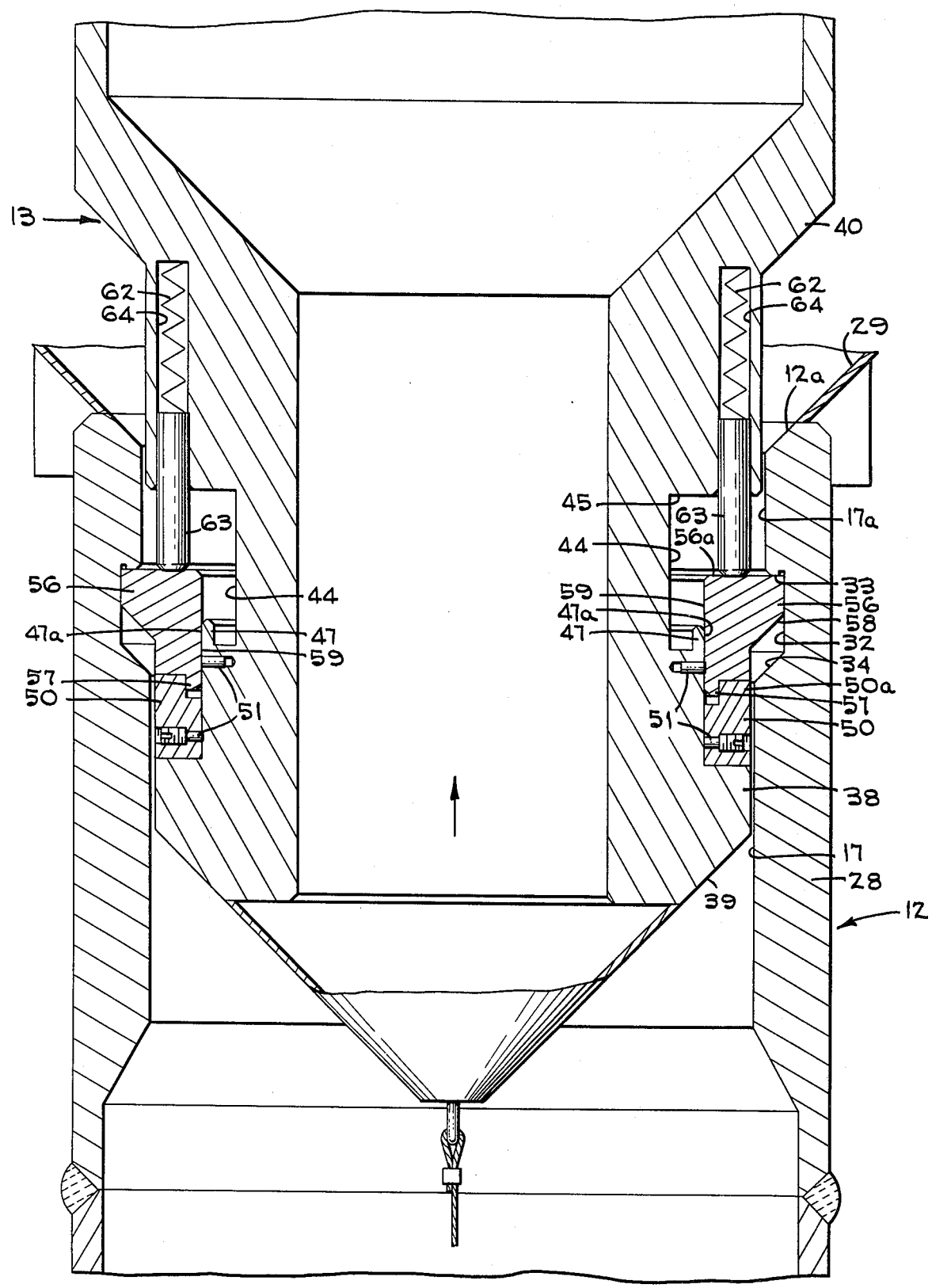

FIG_7
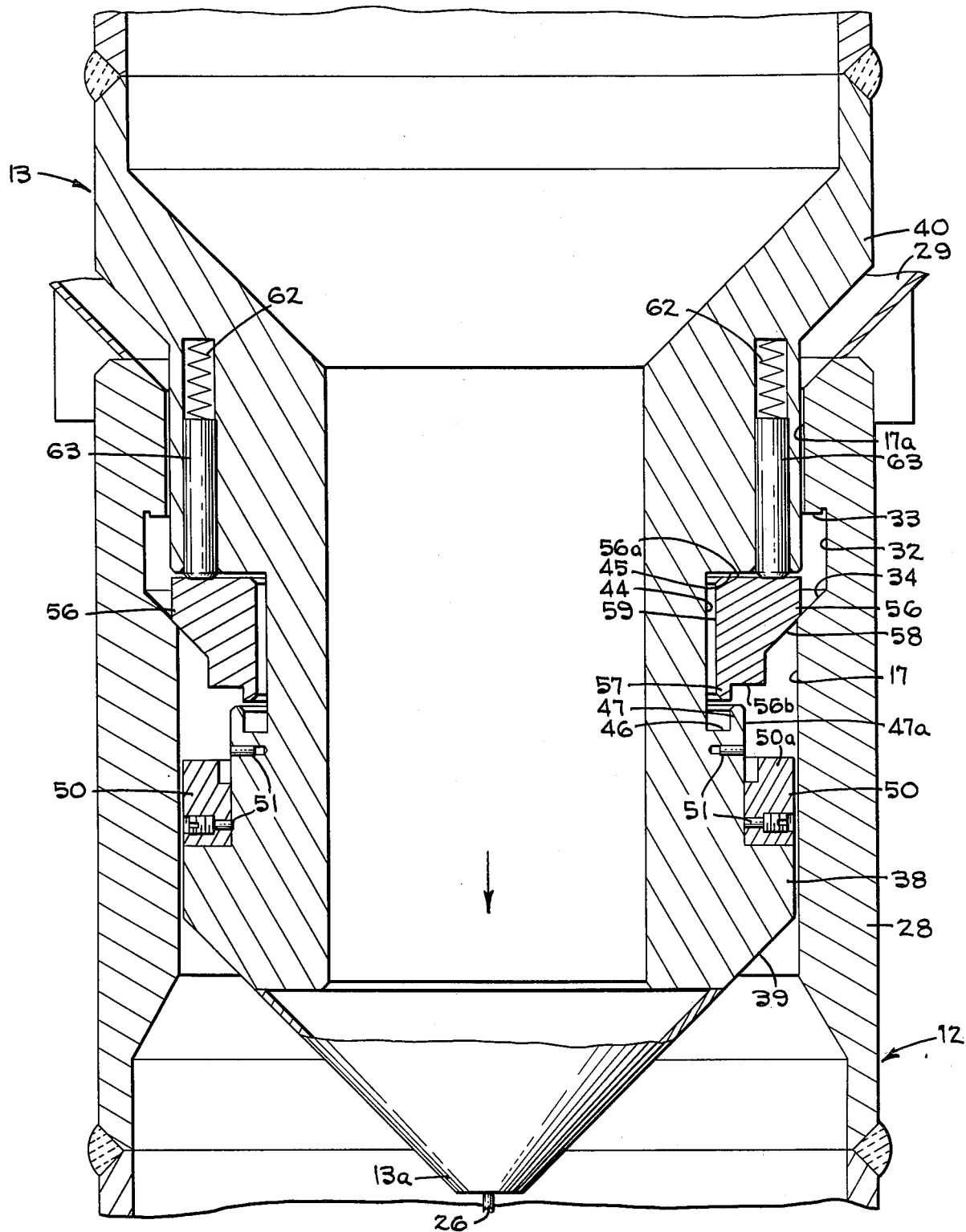

FIG_8
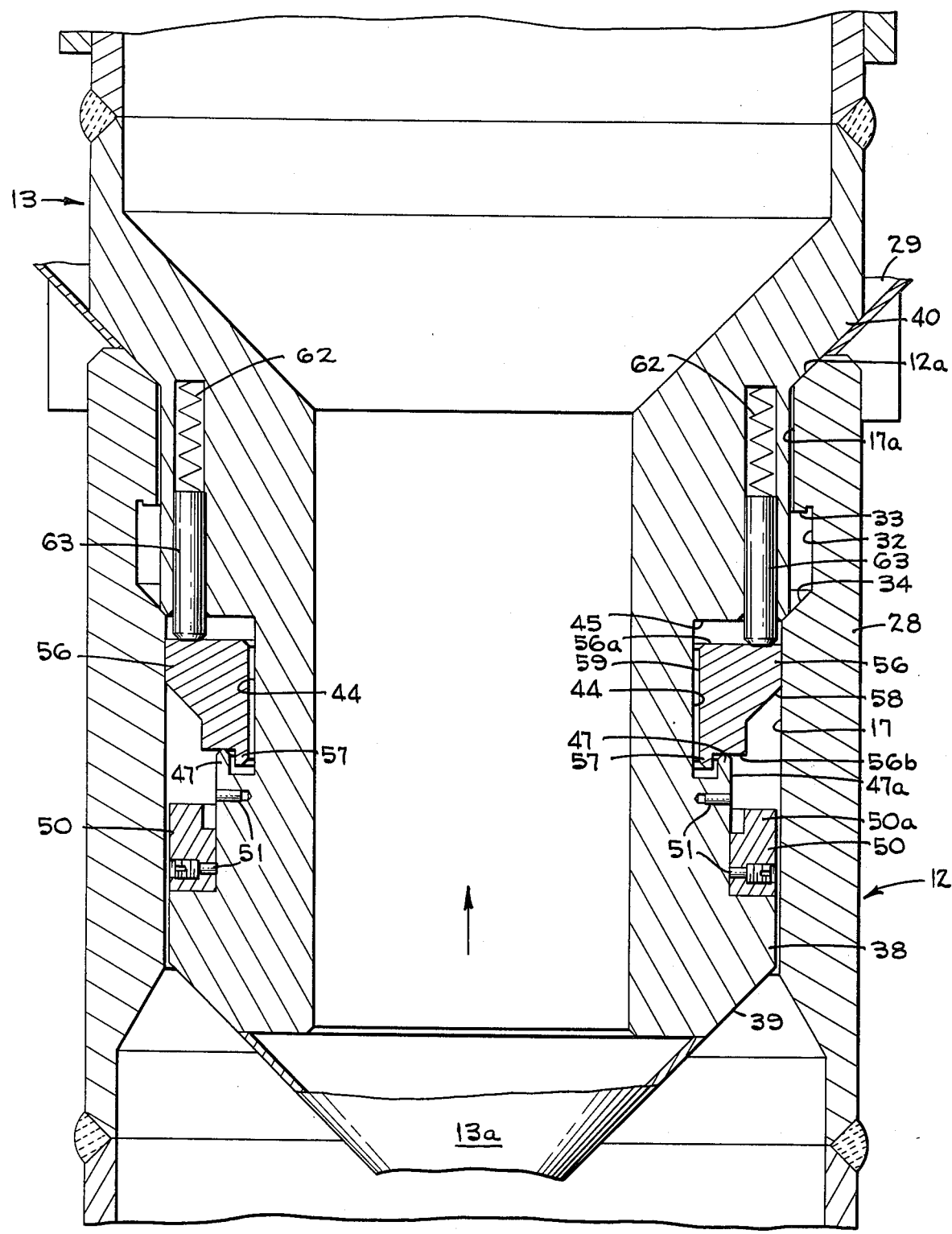

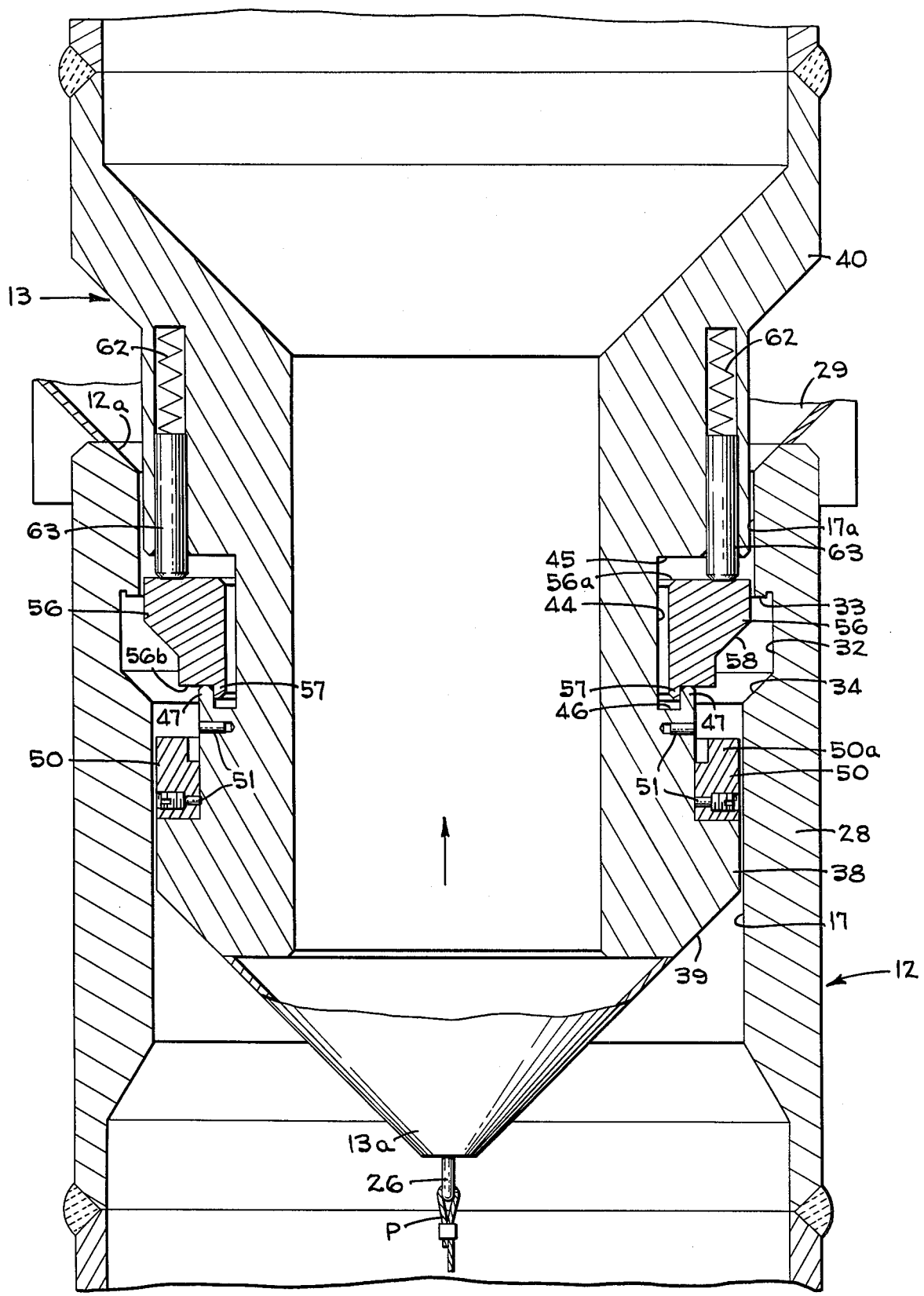

METHOD AND APPARATUS FOR TENSION SETTING AND COMPRESSION RELEASING TUBULAR CONNECTORS

BACKGROUND OF THE INVENTION

1. Field of the Invention

This invention relates to tubular connectors, and more particularly to tubular connectors for use at underwater or other submerged locations.

2. Description of the Prior Art

The production of oil and gas from offshore wells has grown into a major endeavor of the petroleum industry, and this growth had lead to the development of means for drilling, completing wells and recovering petroleum products from wells in deep-water locations where the use of divers is not practical. This has lead to the need of apparatus for connecting pipes together in deep-water locations and for the installation of mooring facilities for supply boats, marine tankers, etc., all without the use of divers.

The prior art underwater facilities employ connectors which are locked and released either by mechanical or hydraulic manipulation or by rotation of one portion of the connectors relative to the other portions. In deep-water locations the joining together of two portions of a connector by rotation is difficult and often impossible. The locking together of portions of a connector by hydraulic manipulation requires hydraulic lines extending from the ocean surface to the sea floor resulting in unreliable, uneconomical and bulky equipment which is difficult to handle, especially in the deeper subsea locations.

Other connectors are employed to secure a buoy or other floating surface facility to a base on the sea floor adjacent one or more subsea wells. The buoy can be used as a station for connection to a supply boat or to a marine tanker. At the deeper locations it is desirable to anchor the buoy by a chain extending between the buoy and a heavy concrete or metal base secured to the sea floor. It may also be desirable to disconnect the chain and buoy from the heavy base and to reconnect them at a later time. In such an installation it is not practical to use a rotary connector to secure the chain to the subsea base or to release the chain. What is needed is a connector having portions that can be stabbed together and secured in a locked position by the use of simple tension, and can be unlocked by the release of the tension.

SUMMARY OF THE INVENTION

The present invention overcomes the foregoing problems and disadvantages by providing an improved connector for releasably securing the ends of the two objects together at a subsea or other remote location, using axial tension to lock two elements of the connector together and axial compression to unlock them. The connector includes an outer element having a central longitudinal cylindrical passage with an annular inner groove, and an inner element with a cylindrical outer surface that slidably fits inside the passage of the outer element. The inner element carries a radially outward biased snap spring on its outer surface that contracts as the inner element is pulled into the outer element, and that then expands into the inner groove to lock the two elements together. Axial tension tending to pull the two elements away from each other, keeps the elements locked together. When the axial tension is released and the inner element is moved downward within the outer element, the snap spring moves out of the inner groove and is secured in a contracted position to then allow the inner element to be moved upwardly and out of the outer element, thereby disconnecting the elements from each other.

BRIEF DESCRIPTION OF THE DRAWINGS

FIG. 1 is a diagrammatic view of an offshore mooring system with a tension set, compression release connector embodying the present invention mounted on a subsea base, and with a subsea buoy between the connector and a surface buoy for maintaining tension on the connector.

FIG. 2 is an enlarged side elevation, with a portion in section, of the subsea connector of FIG. 1, showing the elements aligned and ready to be interconnected.

FIGS. 3-9 are fragmentary vertical sections of the connector elements on a larger scale, showing in sequence the steps for connecting and disconnecting the two connector elements.

DESCRIPTION OF THE PREFERRED EMBODIMENT

An offshore mooring system employing a connector according to the present invention is diagrammatically represented in FIG. 1. This system comprises an anchor base A of concrete or heavy metal secured to the sea floor F by a plurality of anchoring means M, a connector 11 mounted on the base A, a subsea buoy B, a chin or cable C which keeps the buoy B submerged at a distance below the minimum wave trough to insure a steady upward tension on the connector 11, and a surface buoy S connected to the subsea buoy B by a chain G. A tanker or other marine vessel T is secured to the surface buoy S by one or more mooring lines L that permit the tanker to swing freely according to the dictates of wind and current, and yet hold it a proper distance from the buoy for unloading supplies or for other work.

As more easily seen in FIG. 2, the connector 11 includes a female or outer element 12 extending upwardly from the anchor base A, and a male or inner element 13 rotatably connected to the chain C by a swivel joint J. The outer element 12 is annular in shape and has a central axial cylindrical passage or bore 17 into which the inner element 13 can be pulled by a pull-in cable P. The cable P, which is attached to the nose 13a of the inner element 13 by means of an eye 26, extends around a pair of pulleys 18,19 pivotally mounted on the base A by means of brackets 23,24, and then upwardly to a winch W (FIG. 1) mounted on the tanker T, and a radial port 25 (FIG. 2) provides a passage through the outer element 12 for the cable.

The cable P can be installed around the pulleys 18,19 and through the port 25 when the outer element 12 is fastened in position on the anchor base A, and sonar-activated floats (not shown) can be connected to both ends of the cable for retrieval purposes. The base A, together with the outer element 12, the cable, the pulleys and the floats, is lowered to the sea floor and installed with the floats positioned under water until they are activated by a sonar signal from equipment on the tanker T. The sonar signal causes the floats to move to the surface of the water for removal from the cable, whereupon one end of the cable is connected to the eye 26 on the lower end of the connector's inner element 12, and the other end is connected to the winch W on the tanker T.

The outer element 12 of the connector 11 (FIGS. 2-9) has a truncated-cone guide-funnel 29 welded or otherwise rigidly secured to its upper end to facilitate lowering the inner element 12 into the passage 17. In a wall 28 of the element 12 is an annular inner groove 32 with a shoulder-forming radial surface 33 and a lower inwardly sloping cam surface 34, this groove functioning as a means to lock the inner and outer connector elements together, as will be more fully described later. The upper end of the central passage 17 is enlarged at 17a to facilitate connection and disconnection of the outer element 12 to the inner element 13, as does a cam surface 12a at the upper end of the element 12.

The lower end of the inner element 13 (FIGS. 2-9) includes a radially outwardly extending lower flange 38 having a sloping cam surface 39 at the lower portion thereof to facilitate guiding the lower end of the inner element 13 into the passage 17 of the outer element 12. A radially outwardly extending upper flange 40 at the upper end of the inner element is welded or otherwise secured (FIGS. 2, 4) to the swivel joint J. Approximately mid-way between these flanges is a radially inwardly extending groove 44 (FIGS. 3-9) with a shoulder-forming upper radial surface 45, and a lower radial surface 46 terminating in an axially upwardly extending annular lip 47.

An annular shear ring 50, having an axially upwardly extending lip 50a, is mounted immediately below the groove 44 by a plurality of shear pins 51 threaded into bores 52 in the body of the inner element 13. An axially-split outwardly-biased annular snap spring 56, having an axially extending lip 57 (FIGS. 3-9) on its lower portion and an upwardly and outwardly sloping cam surface 58 on its upper portion, is retained in the groove 44 by means of the lip 50a of the shear ring 50. The snap spring 56 is biased downwardly against the shear ring 50 by a plurality of helical springs 62 and positioning pins 63 that are mounted in circumferentially spaced axial bores 64 immediately above the groove 44.

The procedure for connecting the inner element 13 to the outer element 12 and for locking these elements together is sequentially shown in FIGS. 3-6. The inner element 13 (FIG. 3) is pulled into position above the passage 17 of the outer element 12 by the pull-in cable P to approximately center the inner element 13 over the outer element 12. The nose 13a and the cam surface 39 on the lower end of the inner element are guided by the funnel 29 and the cam surface 12a into the passage 17 of the outer element 12 as the inner element 13 is pulled further downward. Further downward movement of the element 13 causes the cam surface 58 of the snap spring 56 to move over the cam surface 12a thereby forcing the snap ring 56 into the groove 44 (FIG. 4) as the inner element 13 is pulled all the way into the outer element 12. An upward tension on the inner element 13 by the chain C, i.e., tending to separate the elements 12 and 13, moves the element 13 upward until the spring 56 expands into the groove 32 (FIG. 5) to lock the elements 12 and 13 together. Further upward tension on the element 13 forces the shear ring 50 against the spring 56 (FIG. 6) causing the pins 51 to shear and moving the flange 38 upward against the ring 50. The annular lip 47 moves upward causing a cam surface 47a on the lip to slide over a cam surface 59 on the snap spring 56 to hold the spring 56 against the radially outward surface of the groove 32. Continued upward tension on the element 13 retains the elements 12 and 13 in the locked position shown in FIG. 6 until the tension is released.

The procedure for disconnecting the two sections of the connector by separating the inner element 13 of the connector from the outer element 12 is sequentially shown in FIGS. 7-9. As the inner element 13 is lowered from the locked position of FIG. 6 toward the fully stabbed position of FIG. 8, the snap spring 56 moves downward in the groove 32 (FIG. 7) until the cam surface 58 of the snap spring 56 is pressed against the cam surface 34 of the groove 32. Further downward movement of the inner element 13 presses the shoulder 45 of the groove 44 against an upper edge 56a of the snap spring 56 forcing the cam surface 58 of the spring to move downward and radially inward over the cam surface 34 and moves the snap spring 56 radially inward into the upper portion of groove 44. The helical springs 62 and the positioning pins 63 move the snap spring 56 (FIG. 8) downward until the lower edge 56b of the snap spring is against the annular lip 47 of the groove 44 with the radial lip 57 of the snap spring between the lip 47 and the radially inward surface of the groove 44 as shown in FIG. 8.

An upward movement of the inner element 13 into the area adjacent the groove 32 (FIG. 9) and adjacent the inner surface 17a allows the snap spring 56 to expand radially outward until the radial lip 57 of the snap spring presses against the lip 47 of the groove 44. The snap spring 56 is held away from the outer surface 17a by the lips 47 and 57 so that the inner element 13 can be moved upward out of the passage 17 of the outer element 12 into the released position.

After the inner element 13 is released it can be raised to the surface (FIG. 1) where the fragments of the shear pins 51 can be removed from the bores 52 in the body of the inner element 13 and from the shear ring 50. The snap spring 56 and the shear ring can be moved into the position shown in FIG. 3 and retained in this position by inserting new shear pins 51. The inner element 13 is ready to be reconnected to the outer element 12.

The present invention includes the following unique features: (1) A tubular connector for remotely connecting a female element of the connector to a male element of the connector and locking the two elements securely together by applying a tension. The two elements are released by relieving the tension and pulling the elements apart. (2) The male element of the connector wedges a snap spring into full engagement with the female element and positively locks the two elements together. (3) The connector includes a mechanism that causes the snap spring to be forced axially at the appropriate time and retained by the male element so that the two elements of the connector can be released. (4) The connector has a sprung detent engageable to lock the two elements together as one element is stabbed into the other; a locking device, by means of which the detent can be locked and rendered inoperative upon movement into a released position, and is held inoperable by a frangible retainer; and a frangible retainer which is broken by a tension movement of the connector elements with respect to each other so that, thereafter compressive movement of the elements relative to each other moves the detent to a released position in which it is locked by the locking device to allow the portions to be separated.

Although the best mode contemplated for carrying out the present invention has been herein shown and described, it will be apparent that modification and variation may be made without departing from what is regarded to be the subject matter of the invention.

What is claimed is:

1. A connector for releasably securing two objects together at a remote location using axial tension to lock two portions of the connector together and using axial compression to unlock the two portions, said connector comprising:

an outer element having an annular passage defined by the inner surface of said outer element, and having an inner groove extending radially outward from the inner surface of said outer element;

an inner element having an annular outer surface to slidably fit inside said passage of said outer element;

a spring means attached to the outer portion of said inner element, said spring means being biased in a radially outward direction from said inner element;

means for compressing said spring means in a radially inward direction to facilitate moving said spring means and said inner element into said passage, said spring means expanding into said inner groove to lock said inner element to said outer element when tension is applied to bias said inner element axially away from said outer element; and a sloping cam surface adjacent said inner groove in said outer element for compressing said spring means in a radially inward direction to release said inner element from said outer element when the weight of said inner element biases said inner element axially toward said outer element.

2. A connector as defined in claim 1 wherein said inner element includes an annular outer groove extending radially inward from said outer surface of said inner element and means for mounting said spring means in said outer groove of said inner element.

3. A connector as defined in claim 2 including means for retaining a portion of said spring means in said outer groove of said inner element when said spring means expands into said inner groove of said outer element to thereby lock said inner element to said outer element.

4. A connector as defined in claim 2 including means for locking said spring means in said outer groove of said inner element when pressure is applied to bias said inner element axially toward said outer element to thereby facilitate the separation of said inner element from said outer element.

5. A connector as defined in claim 1 wherein said inner element includes means for locking said spring means in a compressed position when the weight of said inner element biases said inner element axially toward said outer element to allow said inner element to be separated from said outer element.

6. A connector for releasably securing two objects together at a remote location using axial tension to lock two halves of the connector together and using axial compression to unlock the two halves, said connector comprising:

an outer element having an annular central passage defined by the inner surface of said outer element, and having an annular inner groove extending radially outward from the inner surface of said outer element;

an inner element having an annular outer surface to slidably fit inside the passage of said outer element;

an annular snap spring attached to the outer surface of said inner element, said snap spring being biased in a radially outward direction;

means for compressing said snap spring in a radially inward direction to facilitate moving said snap spring into said passage in said outer element as said inner element moves into said passage in said outer element, said snap spring expanding into said annular inner groove to lock said inner element to said outer element when tension is applied to bias said inner element axially away from said outer element;

a sloping cam surface in said outer element adjacent said annular passage for compressing said snap spring to release said inner element from said outer element when said inner element is biased axially toward said outer element by the weight of said inner element; and an annular lip on said inner element for retaining said spring means in a compressed position to allow said inner element to be moved out of said passage in said outer element.

7. A connector as defined in claim 6 wherein said inner element includes an annular outer groove extending radially inward from said outer surface of said inner element and means for mounting said snap spring in said outer groove of said inner element.

8. A connector as defined in claim 7 where said annular lip secures said snap spring in said outer groove when pressure is applied to bias said inner element axially toward said outer element, said annular lip retaining said snap spring away from said inner groove of said outer element to allow said inner element to be moved axially out of said outer element.

9. A connector as defined in claim 7 including means for retaining at least a portion of said snap spring in said outer groove prior to the movement of said inner element into said central passage of said outer element.

10. A connector as defined in claim 6 wherein said annular lip is adjacent said outer groove in said inner element, and wherein said connector includes a radially extending lip on said snap spring and means for moving said annular lip into engagement with said radial lip when inner element is biased toward said outer element to hold said snap spring away from said inner groove to facilitate the separation of inner and said outer elements.

11. A connector as defined in claim 10 wherein said means for moving the lips into engagement includes said cam surface on said outer element for moving said snap spring radially inward as said inner element is axially moved against said outer element and spring means for moving said snap spring axially toward said annular lip on said inner element.

12. A method for releasably securing an inner element of a connector to an outer element of a connector at a remote location using axial tension to lock the elements together and axial compression to release one element from the other, said method including the steps of:

(1) stabbing said inner element into said outer element, (2) applying an axial tension to lock said inner element to said outer element, (3) retaining said axial tension to retain the elements in a locked position, (4) releasing said axial tension so the weight of said inner element provides an axial compression to unlock said inner element from said outer element, and (5) moving said inner element axially out of said outer element.

13. A method for releasably securing a pair of objects together using axial tension to lock an inner connector element to an outer connector element and using axial compression to release the inner element from the outer element, said method including the steps of:

(1) fastening said inner element to a first object,
(2) fastening said outer element to a second object,
(3) stabbing said inner element into said outer element,
(4) applying an axial tension to lock said inner element to said outer element,
(5) retaining said axial tension to retain the elements in a locked position,
(6) releasing said axial tension so the weight of said inner element provides an axial compression to unlock said inner element from said outer element, and
(7) moving said inner element axially out of said outer element.

* * * * *